United States Patent
Glotzbach et al.

(10) Patent No.: US 6,975,354 B2
(45) Date of Patent: Dec. 13, 2005

(54) DIGITAL STILL CAMERA COLOR FILTER ARRAY INTERPOLATION SYSTEM AND METHOD

(75) Inventors: John W. Glotzbach, Lawrenceville, GA (US); Klaus Illgner, Munich (DE)

(73) Assignee: Texas Instruments Incorporated, Dallas, TX (US)

( * ) Notice: Subject to any disclaimer, the term of this patent is extended or adjusted under 35 U.S.C. 154(b) by 676 days.

(21) Appl. No.: 09/895,915

(22) Filed: Jun. 29, 2001

(65) Prior Publication Data

US 2002/0041761 A1 Apr. 11, 2002

Related U.S. Application Data

(60) Provisional application No. 60/214,951, filed on Jun. 29, 2000, provisional application No. 60/215,000, filed on Jun. 29, 2000, provisional application No. 60/218,415, filed on Jul. 14, 2000, and provisional application No. 60/258,484, filed on Dec. 28, 2000.

(51) Int. Cl.$^7$ .............................................. H04N 9/083
(52) U.S. Cl. ........................ 348/273; 348/280; 382/300
(58) Field of Search .......................... 396/429; 348/273, 348/280, 272, 225.1, 266, 237; 382/162, 300

(56) References Cited

U.S. PATENT DOCUMENTS

| | | | | |
|---|---|---|---|---|
| 5,172,227 A | * | 12/1992 | Tsai et al. | 375/240.2 |
| 5,506,619 A | * | 4/1996 | Adams et al. | 348/272 |
| 5,629,734 A | * | 5/1997 | Hamilton et al. | 348/222.1 |
| 5,652,621 A | * | 7/1997 | Adams et al. | 348/272 |
| 6,791,609 B2 | * | 9/2004 | Yamauchi et al. | 348/273 |

* cited by examiner

Primary Examiner—Wendy R. Garber
Assistant Examiner—Gary C. Vieaux
(74) Attorney, Agent, or Firm—Carlton H. Hoel; W. James Brady; Frederick J. Telecky, Jr.

(57) ABSTRACT

Digital Still Camera (DSC) includes separate preview engine, burst mode compression/decompression engine, image pipeline, CCD plus CCD controller, and memory plus memory controller. ARM microprocessor and DSP share control. Color filter array interpolation by use of green high-frequency added to red and blue plus interpolation.

4 Claims, 9 Drawing Sheets

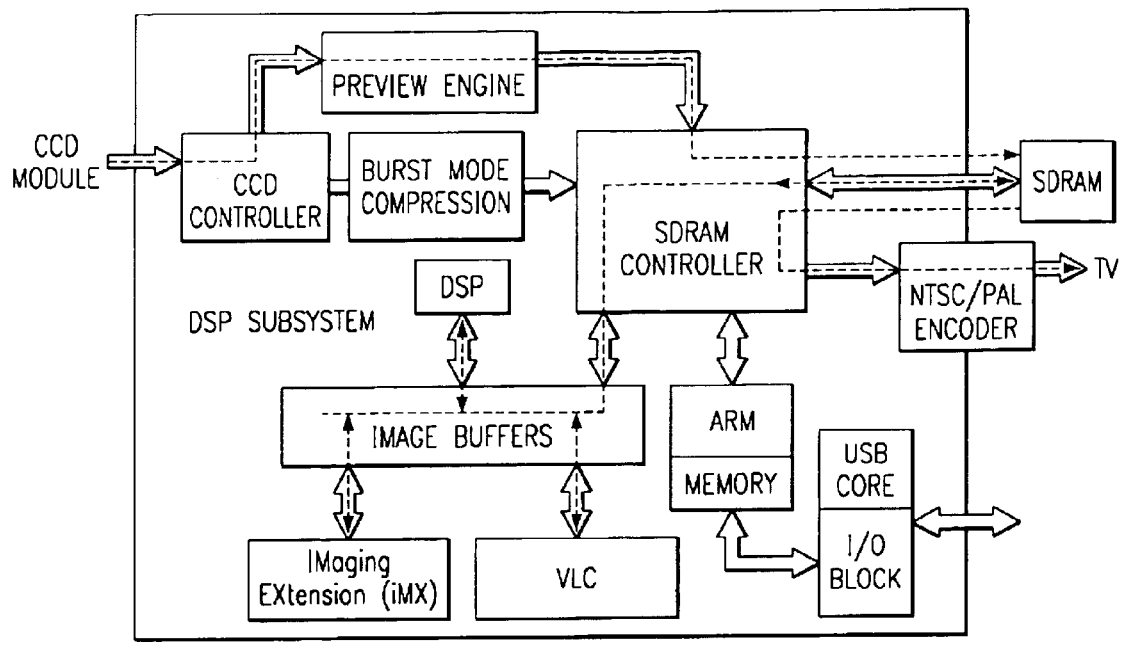
FIG. 6
FIG. 7a
FIG. 7b
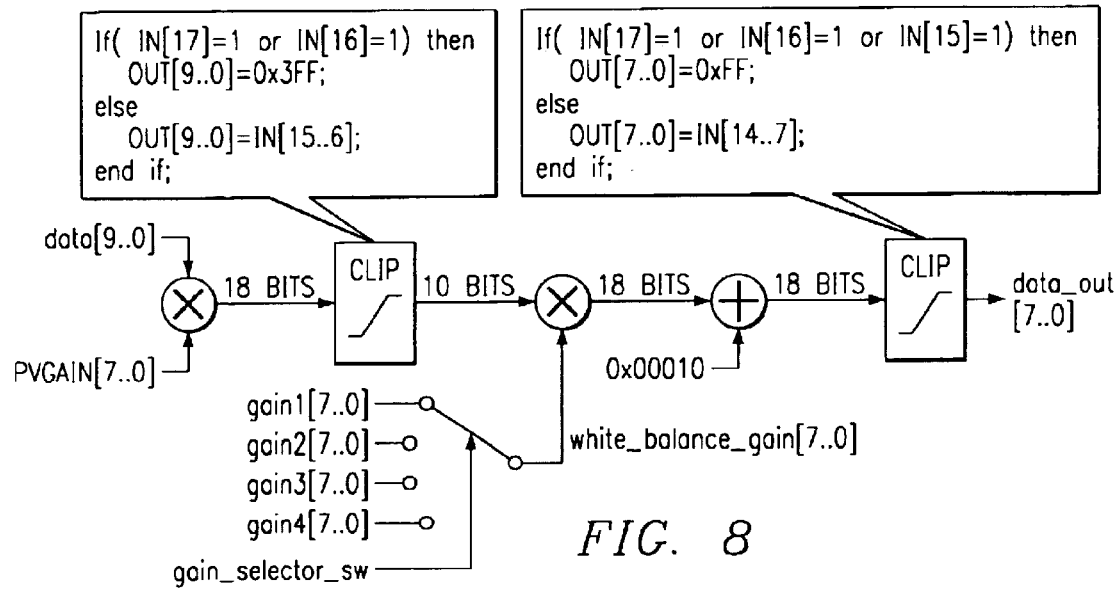
FIG. 8

DIGITAL STILL CAMERA COLOR FILTER ARRAY INTERPOLATION SYSTEM AND METHOD

CROSS REFERENCE TO RELATED APPLICATIONS

This application claims priority from provisional applications Ser. Nos. 60/214,951, filed Jun. 29, 2000; 60/215,000, filed Jun. 29, 2000, 60/218,415, filed Jul. 14, 2000, and 60/258,484, filed Dec. 28, 2000 and from now abandoned application Ser. No. 09/632,543, filed Aug. 4, 2000. The following pending U.S. patent applications disclose related subject matter and have a common assignee with the present application: Ser. No. 09/895,915 filed May 29, 2001.

BACKGROUND OF THE INVENTION

This invention relates to integrated circuits, and more particularly, to integrated circuits and methods for use with digital cameras.

Recently, Digital Still Cameras (DSCs) have become a very popular consumer appliance appealing to a wide variety of users ranging from photo hobbyists, web developers, real estate agents, insurance adjusters, photo-journalists to everyday photography enthusiasts. Recent advances in large resolution CCD arrays coupled with the availability of low-power digital signal processors (DSPs) has led to the development of DSCs that come quite close to the resolution and quality offered by traditional film cameras. These DSCs offer several additional advantages compared to traditional film cameras in terms of data storage, manipulation, and transmission. The digital representation of captured images enables the user to easily incorporate the images into any type of electronic media and transmit them over any type of network. The ability to instantly view and selectively store captured images provides the flexibility to minimize film waste and instantly determine if the image needs to be captured again. With its digital representation the image can be corrected, altered, or modified after its capture. See for example, Venkataraman et al, "Next Generation Digital Camera Integration and Software Development Issues" in Digital Solid State Cameras: Design and Applications, 3302 Proc. SPIE (1998). Similarly, U.S. Pat. No. 5,528,293 and U.S. Pat. No. 5,412,425 disclose aspects of digital still camera systems including storage of images on memory cards and power conservation for battery-powered cameras.

SUMMARY OF THE INVENTION

The invention provides a digital still camera architecture with color-filtered array interpolation using high frequency from the color with the greatest sampling rate to add to the colors with lower sampling rates.

This has advantages including simple interpolation, maintaining sharpness for all colors.

BRIEF DESCRIPTION OF THE DRAWINGS

FIGS. 2–6 illustrate data flows.

FIGS. 7a–7b show CFA arrangements.

FIG. 8 is a functional diagram for white balance.

DESCRIPTION OF THE PREFERRED EMBODIMENTS

1. System Overview

Figure 1A:
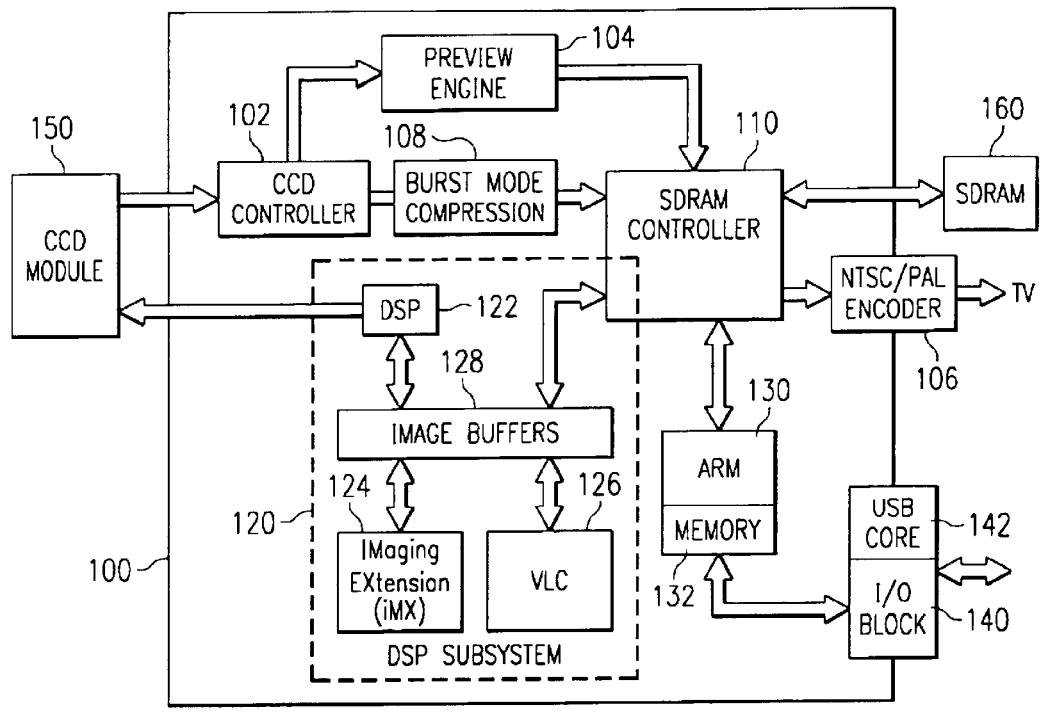
FIGS. 1a–c show a preferred embodiment system in functional block format.
Figure 1B:
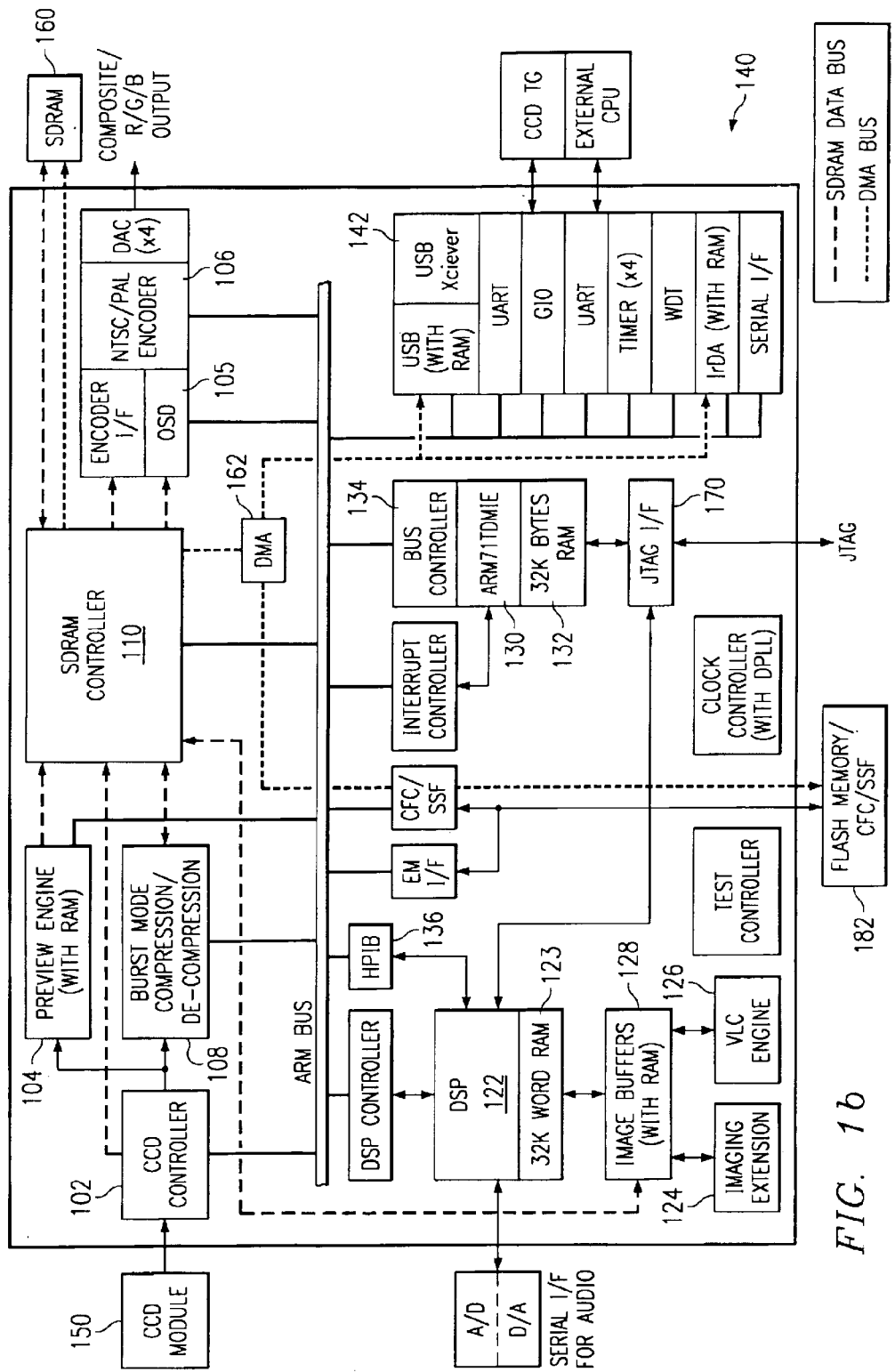

FIGS. 1a–1b show the various high-level functional blocks in a preferred embodiment digital still camera (DSC) and systems with FIG. 1b providing more detail than FIG. 1a. In particular, preferred embodiment integrated circuit 100 includes the following items: CCD Controller 102 interfaced with either CCD or CMOS imager 150. Preview engine block 104 to convert the data from CCD controller 102 into a format suitable for display using NTSC encoder 106 or a digital LCD interface. Burst mode compression-decompression engine 108 to compress the raw image data from CCD controller 102 using a lossless (or lossy, as selected by the user) compression and writes the compressed data to external SDRAM 160 via SDRAM controller 110. This data can then be decompressed by the decompression engine under DSP 122 control, processed, and displayed or stored back to SDRAM 160. DSP subsystem block 120 (DSP 122 and iMX 124 plus Variable Length Coder 126 and buffers 128) performs all the processing of the image data in the capture mode. The data is fetched from SDRAM 160 into image buffer 128 by DSP 122 through requests to SDRAM controller 110, and DSP 122 performs all the image processing and compression required in the capture mode. The Image Extension processor (iMX) 124 acts as a dedicated accelerator to DSP 122 to increase the performance of DSP 122 for the imaging applications.

RISC microprocessor subsystem (ARM 130 plus memory 132) supports the in-camera Operating Systems (OS). Various OSes and other real-time kernels such as VxWorks, Microitron, Nucleus, and PSOS may be supported on circuit 100.

SDRAM controller block 110 acts as the main interface between SDRAM 160 all the function blocks such as the processors (ARM 130, DSP 122), CCD controller 102, TV encoder 106, preview engine 104, etc. SDRAM controller 110 may support up to 80 MHz SDRAM timing and also provide a low overhead for continuous data accesses. It also has the ability to prioritize the access units to support the real-time data stream of CCD data in and TV display data out.

Camera shot-to-shot delay is the time it takes for DSC engine 100 to read the data from CCD 150, process it and write it to SDRAM 160. The processing includes the image pipeline stages and also JPEG compression.

In order to support real-time preview, DSC engine 100 will set CCD 150 in "fast readout" mode, process the data, convert the data to NTSC format, and display the data on a built-in LCD screen (not shown in FIGS. 1a–1b) or TV monitor as the case maybe.

Auto focus, auto exposure and auto white balance (the 3A functions) are performed by DSP 122 while DSC 100 is in the preview mode of operation. DSP 122 reads the image data from SDRAM 160, performs the 3A functions in real-time. The algorithms for the 3A functions are programmable.

Both interlace and progressive CCD and CMOS imagers 150 interface directly to DSC engine 100 using the built-in CCD/CMOS controller 102.

In-camera operating systems such as Microitron will be supported efficiently on ARM processor 130 in DSC engine 100. DSC engine 100 also has the capability to support capturing of a rapid sequence of images in the "burst mode" of operation. Bursts at up to 10 frames/sec of 2 Megapixel images will be supported. The duration of the burst sequence is only limited by the size of SDRAM 160 of the DSC system.

DSC circuit 100 also includes I/O block 140 with USB core 142 for programming and interrupt processing with ARM 130.

CCD module 150 includes a CCD imager to sense the images, driver electronics and a timing generator for the necessary signals to clock the CCD, correlated double sampling and automatic gain control electronics. This CCD data is then digitized and fed into the DSC Engine 100.

SDRAM 160 may be any convenient size and speed SDRAM.

DSC systems may be even more versatile with the ability to annotate images with text/speech. The preferred embodiment programmable DSP allows easy inclusion of a modem and/or a TCP/IP interface for direct connection to the Internet. DSCs may run complex multi-tasking operating systems to schedule the various real-time tasks.

Thus the preferred embodiments provide platforms for programmable camera functions, dual processors (ARM and DSP) plus an image coprocessor, burst mode compression/decompression engine, programmable preview engine, and integration of all camera peripherals including IrDA, USB, NTSC/PAL encoder, DACs for RGB, UART, and compact flash card/smart media card interface. Further, the platforms can provide both camera functions and digital audio playback on the same integrated circuit.

The following sections provide more detail of the functions and modules.

2. DSC Operating Modes

The preferred embodiment systems have (1) Preview mode, (2) Capture mode, (3) Playback mode, and (4) Burst mode of operation as follows.

Figure 2:
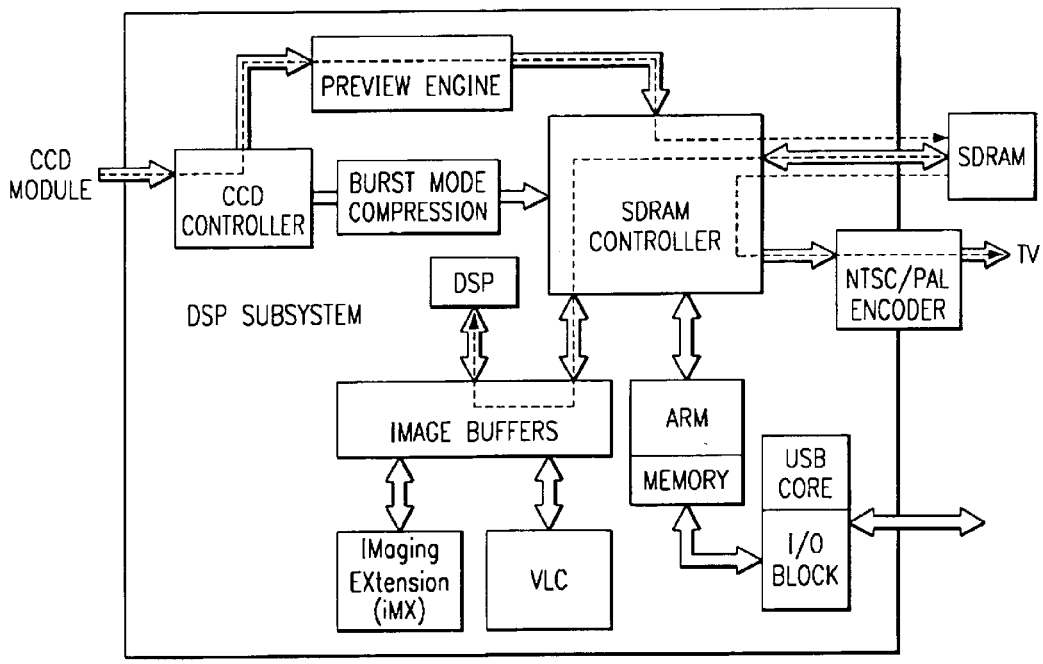

(1) Preview mode has data flow as illustrated in FIG. 2. ARM 130 sets CCD 150 into high-frame-rate readout mode (reduced vertical resolution). ARM 130 enables preview engine 104 and sets the appropriate registers for the default parameters. The raw CCD data is streamed into preview engine 104 and, after preview engine processing, is streamed into SDRAM 160. ARM 130 enables TV encoder 106 to display the preview engine output. Preview engine 104 processing (hardware) includes gain control, white balance, CFA interpolation, down-sampling, gamma correction, and RGB to YUV conversion. ARM 130 commands DSP 122 to perform auto exposure and auto white balance whenever required. DSP 122 processing includes auto exposure, auto white balance, and auto focus. ARM 130 receives new parameters for preview engine 104 and loads the preview engine hardware with these parameters. The output is full resolution CCIR 601 NTSC/PAL and real-time updating of gain, white balance, and auto focus.

Figure 3A:
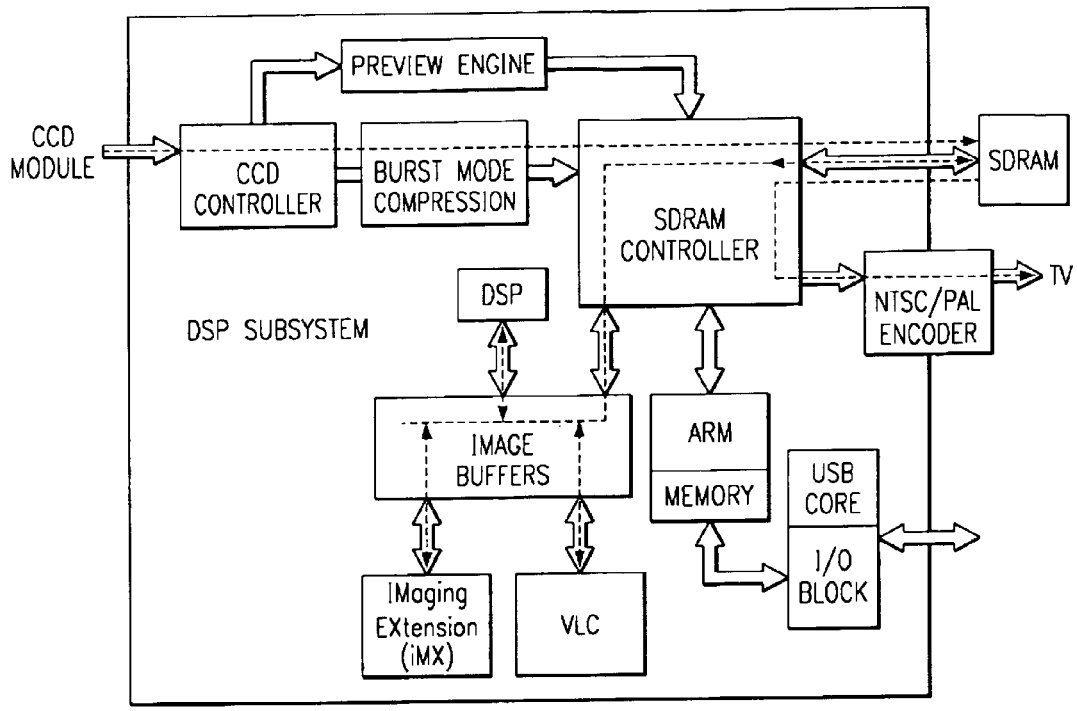

(2) Capture mode has data flow as illustrated in FIG. 3a. ARM 130 sets CCD 150 in "fine" readout mode, full resolution. The CCD data is read directly into SDRAM 160 through SDRAM controller 110. ARM 130 commands DSP 122 (plus IMX 124 and VLC engine 126) perform capture processing: black clamp, fault pixel correction, shading compensation, white balancing, gamma correction, CFA interpolation, color space conversion, edge enhancement, false color suppression, 4:2:0 down-sampling, and JPEG compression. The DSP stores compressed data in the SDRAM. ARM 130 writes the compressed data to compact flash/smart media 182.

Figure 3B:
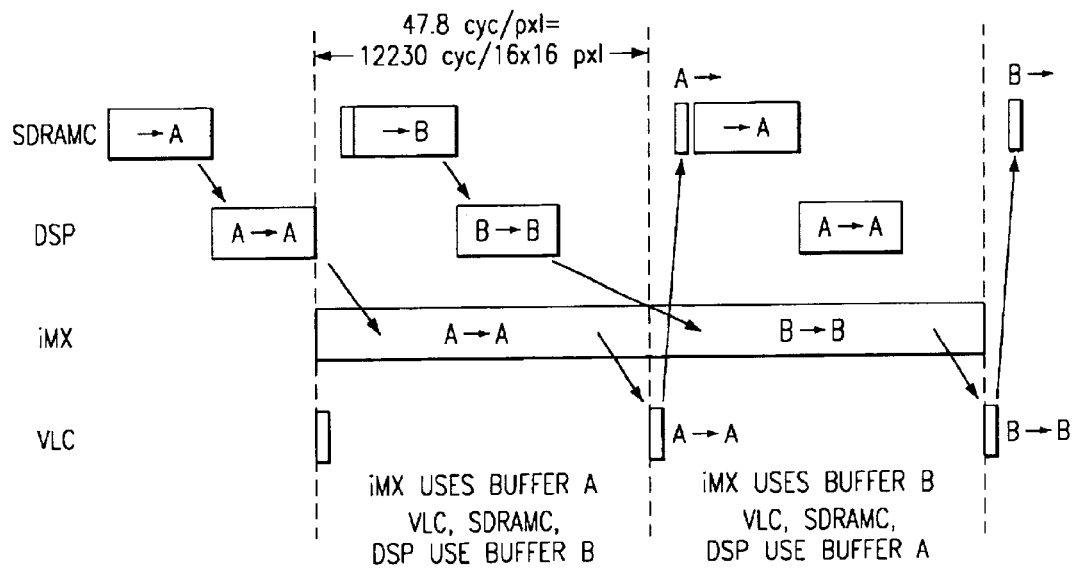

The computation is scheduled as two threads: iMX on one thread, the other units on the other thread. FIG. 3b illustrates the timing of the two threads.

Figure 4:
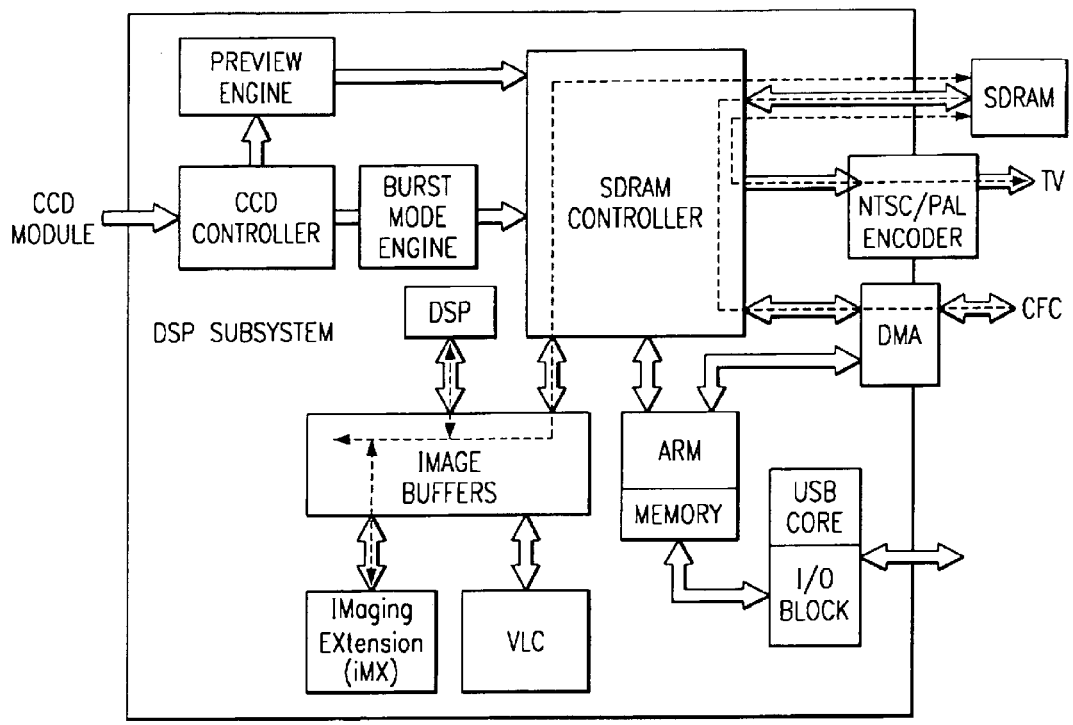

(3) Playback mode has data flow as illustrated in FIG. 4. ARM 130 reads the compressed data from CFC/Smartmedia 182 into SDRAM 160 through the SDRAM controller 110 using DMA 162. ARM commands DSP 122 to do "playback". DSP processing (DSP 122 plus IMX 124 and VLC engine 126) includes JPEG decode (bitstream parsing, IDCT, VLD, and down-sampling for aspect ratio) and store uncompressed image data in SDRAM. ARM enables TV encoder 106 to display the image on TV/LCD display. Note that also audio plus video (e.g., MPEG compressed) clips may be played back.

Figure 5:
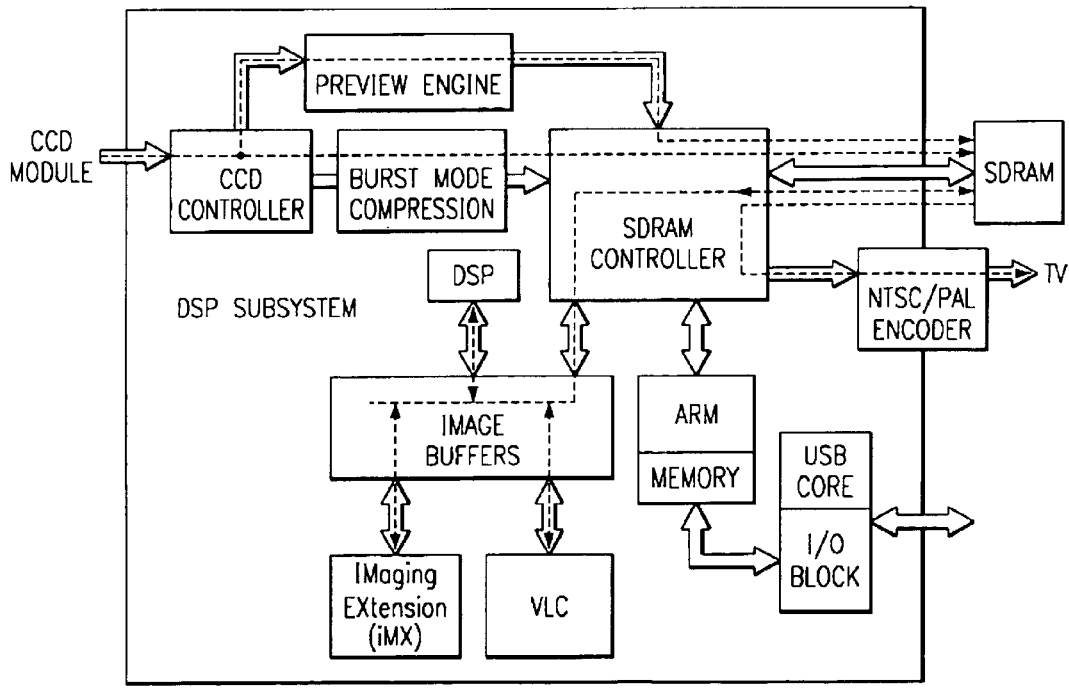

(4) Burst capture mode has data flow as illustrated in FIG. 5, and FIG. 6 shows offline data processing. ARM 130 sets CCD 150 into fine resolution mode. ARM sets up the burst compression parameters, burst length, number of frames/second, compression ratio (lossy, lossless), etc. ARM enables burst compression engine 108 to write the raw CCD data to SDRAM 160. ARM signals DSP to process each of the stored raw CCD images in the burst. Burst mode decompression engine 108 decompresses each of the burst captured images. DSP processes each of the images as in normal capture and writes the JPEG bitstream to SDRAM 160.

Burst capture mode is achieved by repeated calls to the regular playback routine with a different JPEG bitstream each time by ARM 130.

The preferred embodiment also has MPEG1 capture mode and playback mode.

3. Image Acquisition

A DSC usually has to perform multiple processing steps before a high quality image can be stored. The first step is the image acquisition. The intensity distribution reflected from the scene is mapped by an optical system onto the imager. The preferred embodiments use CCDs, but a shift to CMOS does not alter the image processing principles. To provide a color image the imager (CCD or CMOS) has each pixel masked by a color filter (such as a deposited dye on each CCD photosite). This raw imager data is normally referred as a Color-Filtered Array (CFA). The masking pattern of the array of pixels in the CCD as well as the filter color primaries vary between different manufactures. In DSC applications, the CFA pattern that is most commonly used is an RGB Bayer pattern that consists of 2×2 cell elements which are tiled across the entire CCD-array. FIG. 7a depicts a subset of this Bayer pattern in the matrix block following the CCD camera. Note that half of the pixels are sensitive to green and that the red and blue are balanced to green. FIG. 7b shows a subset of the alternative complementary color CFA pattern with yellow, cyan, green, and magenta pixels.

4. Image Pipeline

Figure 1C:
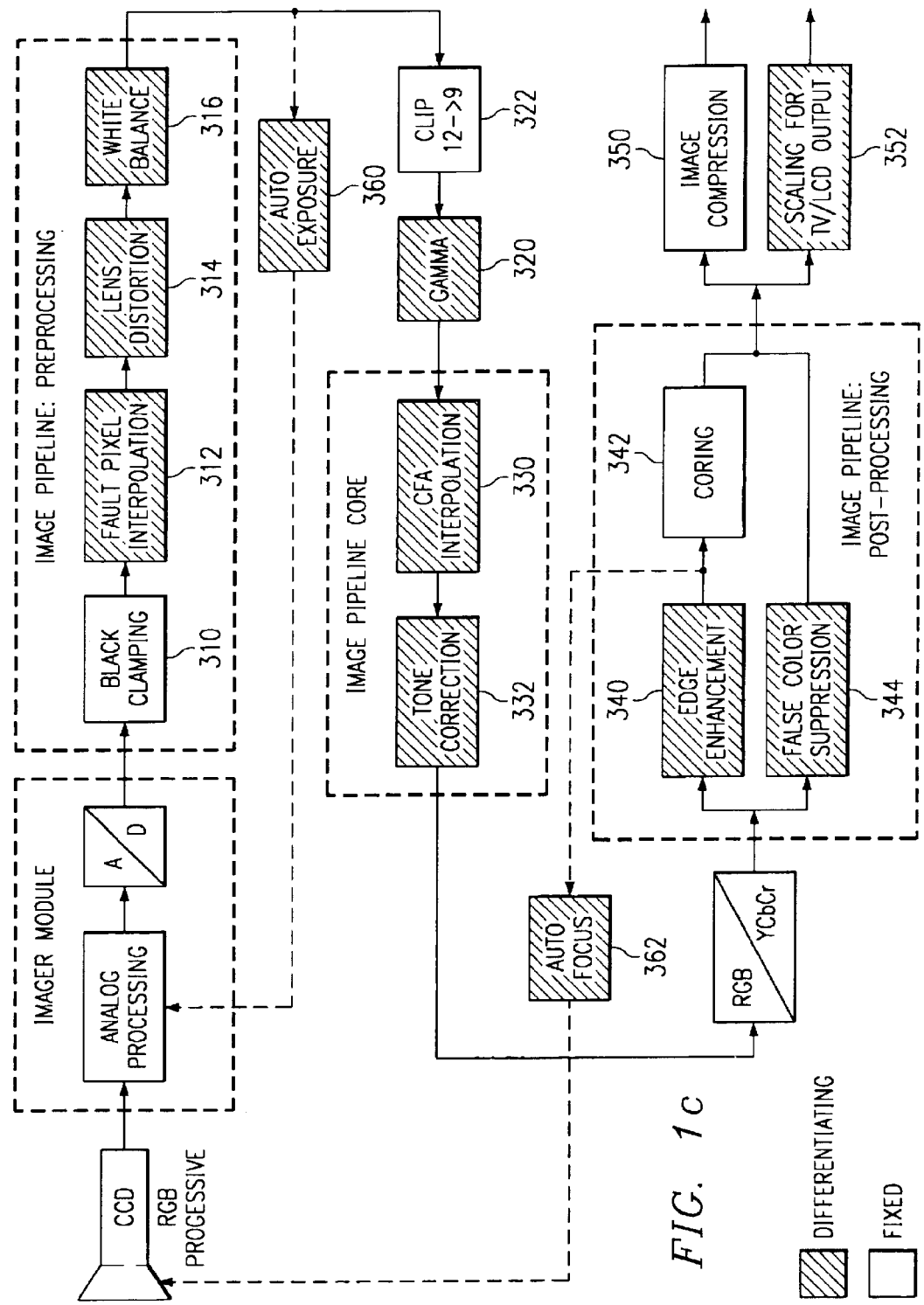

CFA data needs to undergo a significant amount of image processing before the image can be finally presented in a usable format for compression or display. All these processing stages are collectively called the "image pipeline". The preferred embodiment DSC may perform multiple processing steps before a high quality image can be stored; FIG. 1c illustrates possible operations. Most of the image pipeline processing tasks are multiply-accumulate (MAC) intensive operations, making a DSP a preferred platform. The various image pipeline processing stages are described in the following sections.

5. A/D Converters

The A/D converter digitizing the CCD imager data may have a resolution of 10 to 12 bits. This allows for a good dynamic range in representing the input image values. Of course, higher resolution implies higher quality images but more computations and slower processing; and lower resolution implies the converse. The A/D converter may be part of the CCD module.

6. Black Clamp

After A/D conversion the "black" pixels do not necessarily have a 0 value due to a CCD which may still record some current (charge accumulation) at these pixel locations. In order to optimize the dynamic range of the pixel values represented by the CCD imager, the pixels representing black should have a 0 value. The black clamp function adjusts for this by subtracting an offset from each pixel value. Note that there is only one color channel per pixel at this stage of the processing.

7. Fault Pixel Interpolation

CCD-arrays may have defective (missing) pixels, especially arrays with more than 500,000 elements. The missing pixel values are filled by simple interpolation. A high order interpolation may not be necessary because an interpolation is also performed in the CFA interpolation stage. Therefore, the main reason for this preliminary interpolation step is to make the image processing regular by eliminating missing data.

Typically, the locations of the missing pixels are obtained from the CCD manufacturer. The faulty pixel locations can also be computed by the DSC engine offline. For example, during camera initialization operation, an image with the lens cap closed is captured. The faulty pixels appear as "white spots" while the rest of the image is dark. The faulty pixel locations can then be identified with a simple threshold detector and stored in memory as a bitmap.

During the normal operation of the DSC the image values at the faulty pixel locations are filled by a simple bilinear interpolation technique.

8. Lens Distortion Compensation

Due to non-linearities introduced by imperfections in lenses, the brightness of the image decreases from the center of the image to the borders of the image. The effects of these lens distortions are compensated by adjustment of the brightness of each pixel as a function fo its spatial location. The parameters describing the lens distortions need to be measured with the final system, supported by information supplied by the lens manufacturer.

The lens adjustment can be accomplished by multiplying the pixel intensity with a constant, where the value of the constant varies with the pixel location. The adjustment needs to be done for both horizontal and vertical directions.

9. White Balance

White balancing tries to transform the tristimulus values sensed under a certain light condition such that if displayed white appears again as white. In general the colors as captured by the camera do not appear on an output device as they were seen when capturing the scene. A couple of reasons account for that.

First, the sensitivity of the color filters over the spectral range are slightly different. If exposed with a perfect white light source (constant light spectrum) the tristimulus values sensed by the CCD are slightly different.

Second, the design of the entire CCD module and the optical system add to the imbalance of the tristimulus values.

Third, typical illuminants present while recording a scene are not constant. The illuminants have a certain "color", which is typically characterised as "color temperature" (or correlated color temperature). If an image captured under illuminant 1 is displayed under a different illuminant the color appearance changes. This causes a white area to turn a little bit red or a little bit blue.

Several different approaches for white balancing are known. Most of them multiply the red and blue channels with a factor such that the resulting tristimuls value for a white patch has identical values:

$$\begin{bmatrix} R' \\ G' \\ B' \end{bmatrix} = \begin{bmatrix} a1 & 0 & 0 \\ 0 & 1 & 0 \\ 0 & 0 & a2 \end{bmatrix} \begin{bmatrix} R \\ G \\ B \end{bmatrix},$$

$R' = G' = B'$ for a neutral (gray) patch

However, as explained later, this approach does not provide correction for changes of the illuminant. Therefore, the white balancing implementation in preferred embodiment system corrects imbalances of the sensor module. The illumination correction is handled at a later stage in the color correction section.

Typical techniques to calculate the gain factors are (1) equal energy $$a1 = \sum_{(x,y)} g^2(x, y) \bigg/ \sum_{(x,y)} r^2(x, y)$$

(2) gray world assumption $$a1 = \sum_{(x,y)} g(x, y) \bigg/ \sum_{(x,y)} r(x, y)$$

(3) maximum value in an image is white $$a1 = \max_{(x,y)} g(x, y) \bigg/ \max_{(x,y)} r(x, y)$$

All of them do not hold in every case. Therefore, by defining the white balancing mainly as a correction of imager module characteristics, the algorithms to obtain the correction values can be made almost scene independent.

The FIG. 8 depicts the simplified realization of the preview engine, giving good results as long as the CCD sensor operates in the linear range. More sophisticated methods of white balance may be used.

10. Gamma Correction

Display devices (TV monitors) used to display images and printers used to print images have a non-linear mapping between the image gray value and the actual displayed pixel intensities. Hence, in the preferred embodiment DSC Gamma correction stage compensates the CCD images to adjust them for eventual display/printing.

Gamma correction is a non-linear operation. The preferred embodiments implement the corrections as table look ups. The advantages of table look up are high speed and high flexibility. The look-up table data might even be provided by the camera manufacturer.

Figure 9A:
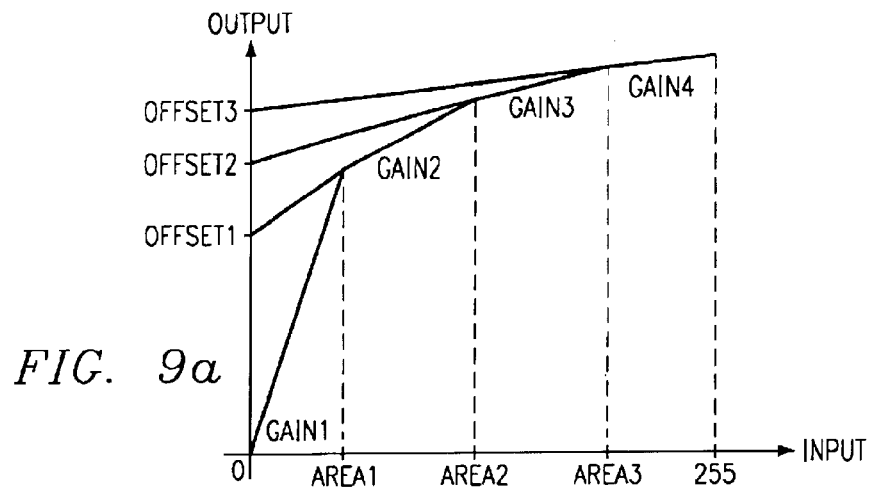
FIGS. 9a–9b show gamma correction.
Figure 9B:
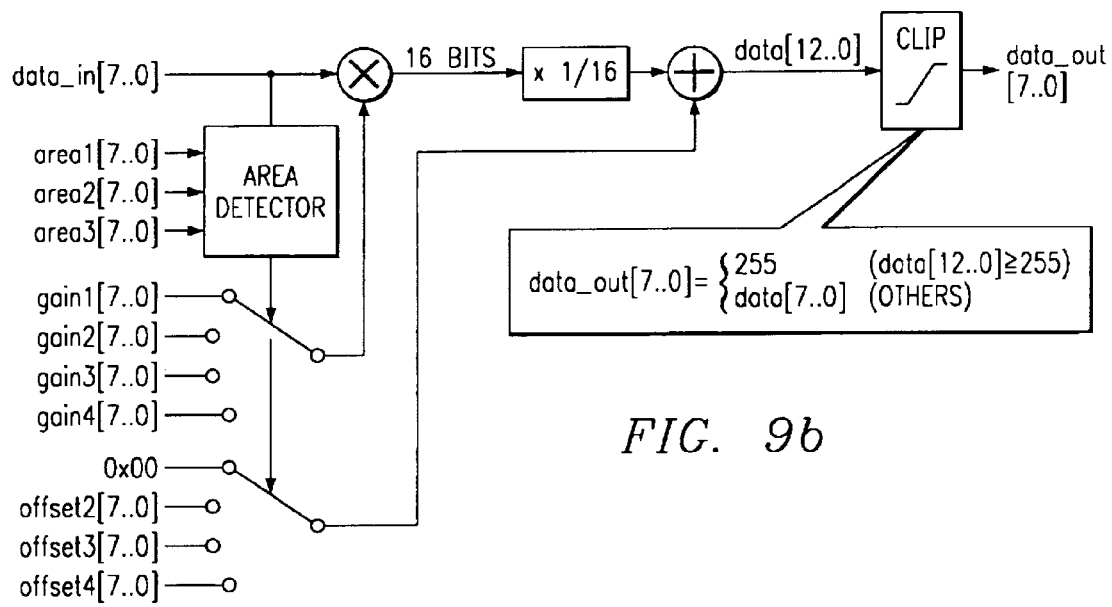

With 12-bit data, a full look-up table would have 4K entries, with each entry 8 to 12 bits. For a smaller look-up table, a piecewise linear approximation to the correction curves could be used. For example, the 6 most significant bits could address a 64-entry look-up table whose entries are pairs of values: a base value (8 to 12 bits) and a slope (6 bits). Then the product of the 6 least significant bits and the slope is added to the base value to yield the final corrected value of 8 to 12 bits. FIG. 9a illustrates a piecewise linear approximation curve, and FIG. 9b the corresponding operations.

Note that LCD displays can be considered to be linear, making gamma compensation unnecessary. However, LCD display modules usually expect an NTSC input (which is already gamma compensated) and hence perform some "gamma uncorrection" (inverse gamma correction) to compensate for this expected gamma correction. So in the preferred embodiment DSCs using such LCD preview modules, still perform Gamma correction and then NTSC encode the signal before feeding it to the LCD module.

Gamma correction may be performed at the end of the all the stages of the image pipeline processing and just before going to the display. Alternatively, the image pipeline could perform the Gamma correction earlier in the pipeline: before the CFA interpolation stage.

11. CFA Interpolation

Due to the use of a color-filtered array (CFA), the effective resolution of each of the color planes is reduced. At any given pixel location there is only one color pixel information (either of R, G, or B in the case of RGB color primaries). However, it is required to generate a full color resolution (R, G, and B) at each pixel in the DSC. To be able to do this, the missing pixel values (R and B at a G location, etc.) are reconstructed by interpolation from the values in a local neighborhood in the CFA interpolation. To take advantage of the DSP in this system a FIR-kernel is employed as interpolation filter. The length of the filter and the weights vary from one implementation to the other. Also the interband relationship has to be considered. The realization of the CFA interpolation in the hardwired preview engine module may differ from that of the programmed CFA interpolation. It basically employs a 1D FIR kernel for horizontal followed by vertical interpolation.

The implementation in the DSP subsystem for high quality image processing is different in that it is fully programmable and able to utilize 2D filter kernels. Some background information and a proposal for an improved CFA interpolation technique is given in the "CFA interpolation with reduced aliasing" section below.

12. Color Correction

Changes in the color appearance caused by differing illuminants between capture and playback/print cannot be corrected just by balancing the red, green and blue channels independently. To compensate for this, a tone (color) correction matrix maps the RGB pixel values to corrected RGB pixel values that take the illuminant into account.

The principle is as follows. Let I1 denote an N×N diagonal matrix describing the recording illuminant, S the N×3 matrix denoting the spectral characteristics of the imager module with one column vector for each color and R the 1×N column vector describing the reflectance of the scene. The measured tristimulus value X1 at a pixel location is given by:

$$X1^T = R^T * I1 * S$$

Denoting $$SS = S * S^T$$

we can transform the measured tristimulus value X1 into X2, we would have been measured if the scene would have been illuminated by I2:

$$X2^T = X1^T * S^T * SS^{-1} * I1^{-1} * I2 * S$$

The 3×3 transform matrix $S^T * SS^{-1} * I1^{-1} * I2 * S$ can be calculated offline, assuming that the spectral response of the sensor can be measured. Thus it is sufficient to store a set of color correction matrices for different illuminants in the camera.

Since the subjective preferences of the color appearance changes among users, it is easily possible to include these into the color correction matrix or add a separate step to the image processing pipeline (e.g. "tone scale").

13. Color Space Conversion

Figure 10A:
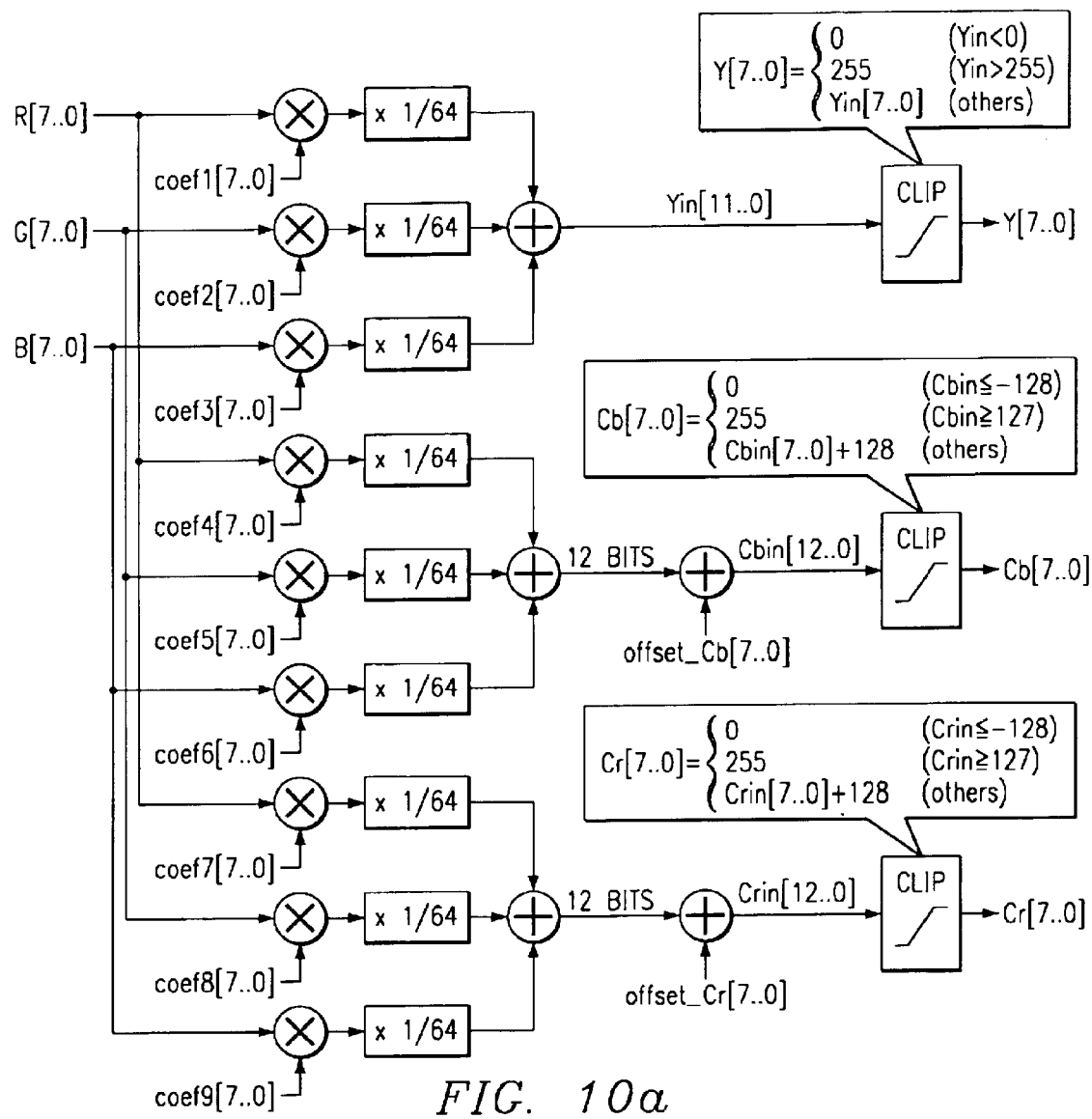
FIGS. 10a–10b show color conversion.

After the CFA interpolation and color correction, the pixels are typically in the RGB color space. Since the compression algorithm (JPEG) is based on the YCbCr color space, a color space transformation must be carried out. Also the preferred embodiment DSC generates a NTSC signal output for display on the TV and also to feed into the LCD preview. Hence an RGB to YCbCr color space conversion needs to be carried out. This is a linear transformation and each Y, Cb, Cr value is a weighted sum of the R, G, B values at that pixel location. FIG. 10a illustrates the color conversion as realized in the hardwired preview engine. The DSP (playback) implementation is similar in principle but allows a higher precision conversion:

$$\begin{bmatrix} Y \\ Cb \\ Cr \end{bmatrix} = \begin{bmatrix} a1 & a2 & a3 \\ a4 & a5 & a6 \\ a7 & a8 & a9 \end{bmatrix} \begin{bmatrix} R \\ G \\ B \end{bmatrix}$$

14. Edge Enhancement

After CFA interpolation the images appear a little "smooth" due to the low pass filtering effect of the interpolation filters. To sharpen the images it is sufficient to operate on the Y-component only. At each pixel location we compute the edge magnitude using an edge detector, which is typically a two-dimensional FIR filter. The preferred embodiment uses a 3×3 Laplace-Operator. The edge magnitude is thresholded and scaled and before being added to the original luminance (Y) image to enhance the sharpness of the image.

Figure 10B:
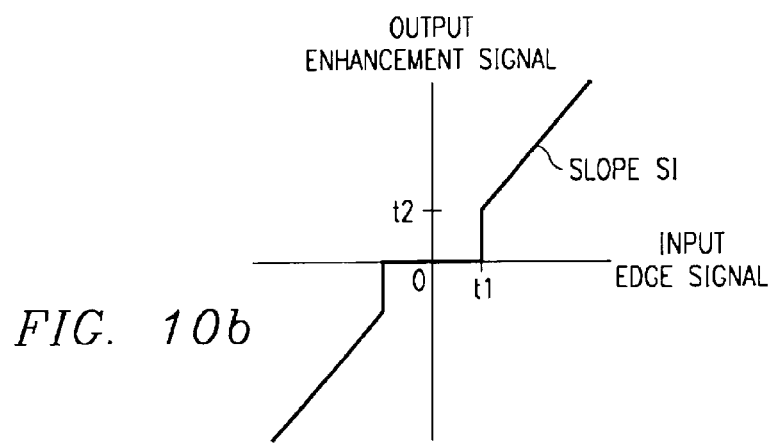

The edge enhancement is a high pass filter; this high pass filter also amplifies the noise. To avoid this amplified noise, a threshold mechanism is used to only enhance those portion of the image lying on an edge. The amplitude of the amplified edge may vary. The threshold operation is necessary to reduce amplification of noise. Therefore, only those pixels get enhanced which are an element of an edge. The enhancement signal added to the luminance channel can be represented graphically as in FIG. 10b; the parameters t1, t2, and the slope s1 can be chosen as seen necessary to obtain the best quality.

15. False Color Suppression

Note that the edge enhancement is only performed in the Y image. At edges the interpolated images of the color channels may not be aligned well. This causes annoying rainbow-like artifacts at sharp edges. Therefore, by suppressing the color components Cb and Cr at edges in the Y-component, these artifacts can be reduced. Depending on the output of the edge detector, the color components Cb and Cr are multiplied by a factor less than 1 on a per pixel basis to suppress the false color artifacts.

16. Image Compression

The image compression step compresses the image, typically by about 10:1 to 15:1. The preferred embodiment DSC uses JPEG compression. This is a DCT-based image compression technique that gives good performance.

17. Auto Exposure

Due to the varying scene brightness, to get a good overall image quality, it is necessary to control the exposure of the CCD to maximize the dynamic range of the digitized image. The main task of exposure control is to keep the sensor operating in the linear range by controlling the shutter speed, and if possible the aperture of the optical system. Since closing the iris and slowing down the shutter speed compensates each other, there exists a certain parameter range in which the exposure remains unchanged. It is obvious that this can be accomplished only to a certain extent as other constraints as capturing fast moving scenes may be desired by the user.

Besides trying to keep the sensor operating in the linear range it is desirable to maximize the dynamic range of the ADC and hence the digitized image. This is done by controlling the PGA in the AFE. The processing necessary to obtain the relevant control parameters is performed on the DSP.

18. Auto Focus

It is also possible to automatically adjust the lens focus in a DSC through image processing. Similar to Auto Exposure, these auto focus mechanisms operate also in a feed back loop. They perform image processing to detect the quality of lens focus and move the lens motor iteratively till the image comes sharply into focus. Auto focus may rely on edge measurements from the edge enhancement previously described.

19. Playback

The preferred embodiment DSCs also provide the ability for the user to view the captured images on LCD screen on the camera or on an external TV monitor. Since the captured images are stored in SDRAM (or on compact flash memory) as JPEG bitstreams, playback mode software is also provided on the DSP. This playback mode software decodes the JPEG bitstream, scales the decoded image to the appropriate spatial resolution, and displays it on the LCD screen and/or the external TV monitor.

20. Down-Sampling

In the preferred embodiment DSC system the image during the playback mode after decoding the JPEG data is at the resolution of the CCD sensor, e.g. 2 Megapixels (1600× 1200). This image can even be larger depending on the resolution of the CCD sensor. However, for the display purposes, this decoded data has to be down-sampled to NTSC resolution (720×480) before it can be fed into the NTSC encoder. Hence, the DSC should implement a down-sampling filter at the tail end of the playback mode thereby requiring additional DSP computation.

The preferred embodiment solves this problem of additional DSP computations by a DCT-domain down-sampling scheme that is included as part of the JPEG decompression module. Note that the JPEG decompression essentially involves three stages: first an entropy decoding stage, followed by an inverse quantization stage, and finally an IDCT stage. In JPEG the IDCT is performed on a block of 8×8 pixels. The preferred embodiments down sample a 2 Megapixel image to NTSC resolution (a 4/8 down-sampling) in the IDCT domain by employing a 4×4 IDCT to the top left 4×4 DCT coefficients (out of a 8×8 DCT coefficient block) and hence effectively achieving both the IDCT and the 4/8 down-sampling in one step. The sampling ratio can be varied between 1/8 (smallest image) to 8/8 (full resolution image).

A separable two-dimensional 4-point IDCT is applied to obtain a 4×4 block of image pixels from the top-left (low spatial frequency) 4×4 DCT coefficients. By this low-order IDCT we effectively combine anti-aliasing filtering and 8-to-4 decimation. The employed anti-aliasing filter corresponds to a simple operation of preserving only the 16 lowest frequency components in the DCT domain without scaling the preserved DCT coefficients. Though this simple filter is effective in reducing aliasing effect, the preferred embodiments may have a lowpass filter with better frequency response to further reduce aliasing. The use of other lowpass filters will lead to scaling of the preserved coefficients where the scaling factor is the location of each DCT coefficient.

Note that the DCT domain down-sampling technique does not increase the computational complexity. In fact, it reduces the computation since the JPEG decoding stages after entropy decoding does not need to deal with the whole 8×8 DCT coefficients except the top-left 4×4 coefficients. Use of other anti-aliasing filters also does not add any complexity since the coefficient scaling operation can be merged into the low-order IDCT operation. Also note that this DCT domain down-sampling idea technique can offer n/8 down-sampling ratios, n=1, . . . , 7, for other CCD sensor resolutions.

21. Up-Sampling

Displaying cropped images for zooming of images also uses an up-sampling scheme. The inverse approach to the down-sampling provides an elegant tool. In the first case the 8×8 DCT coefficients are (virtually) vertically and horizontally extended with zeroes to form a block of N×M coefficients (N,M>8). On this block an IDCT of size N×M is executed yielding N×M samples in the spatial domain.

Currently, most image pipeline operations are non-standardized. Having a programmable DSC engine offers the ability to upgrade the software to conform to new standards or improve image pipeline quality. Unused performance can be dedicated to other tasks, such as human interface, voice annotation, audio recording/compression, modem, wireless communication, etc.

FIG. 1c shows a preprocessing functional block diagram including CFA interpolation, white balance, color correction, tone scaling, gamma correction, conversion of RGB to YCrCb, edge enhancement, edge detection, color boost, and false color suppression in preparation of JPEG compression. The following sections describe preferred embodiments relating to CFA interpolations.

22. CFA Interpolation with Reduced Aliasing

A preferred embodiment CFA interpolation for a Bayer pattern (FIG. 7a) uses the high-frequency from the green channel to modify the red and blue channel interpolations to reduce the aliasing components at edges within the image by utilizing the signal of the other color channels. By this means artifacts are reduced, sharpness improved, and additional post-processing avoided. Indeed, proceed as follows.

(1) apply interpolation to green channel (any interpolation method); this yields the green plane.

(2) detect edges in the green channel (by gradient or other method).

(3) compute high-pass component of the green channel (filter with any high-pass filter).

(4) apply interpolation to the red channel (any interpolation method); this yields the red plane.

(5) add high-pass component of (3) (with a weighting factor) to red channel.

(6) apply interpolation to the blue channel (any interpolation method); this yields the blue plane.

(7) add high-pass component of (3) (with a weighting factor) to the blue channel.

Theoretical analysis of the foregoing: Each CCD pixel averages the incident optical signal over the spatial extent of the pixel; thus the CCD effectively provides a low-pass filtering of the incident optical signal with a cutoff frequency the reciprocal of the pixel size. Further, the subsampling of the pixel array by the color filters on the pixels leads to aliasing in each color plane. Indeed, for red and blue the subsampling is by a factor of 2 in each direction; so the frequency spectrum folds at half the maximum frequency in each direction. Thus the red and blue baseband spectra areas are each one-quarter of the original array spectrum area (reflecting that the red and blue samplings are each one-quarter of the original array). For green the subsampling is only half as bad in that the spectrum folding is in the diagonal directions and at a distance $\sqrt{2}$ as large as for the red and blue. The green baseband spectrum is one-half the area of the original array spectrum.

Color fringing at edges is an aliasing problem. In addition, dissimilar baseband spectra lead to color fringing as well, even if no aliasing is present. Indeed, aliasing is not necessarily visible in a single color band image, but the effect becomes obvious upon combination of the three color components into one color image. The shift of the sampling grids between red, green, and blue causes a phase shift of the aliasing signal components. A one-dimensional example clarifies this: presume a one-dimensional discrete signal f(n) and two subsamplings, each by a factor of 2 but one of even-numbered samples and one of odd-numbered samples (so there is a shift of the sampling grids by one sample):

$$f_{even}(2m)=f(2m)$$

$$f_{even}(2m+1)=0$$

$$f_{odd}(2m)=0$$

$$f_{odd}(2m+1)=f(2m+1)$$

Of course, $f(n)=f_{even}(n)+f_{odd}(n)$. Let F(z) be the z-transform of f(n), $F_{even}(z)$ the z-transform of $f_{even}(n)$, and $F_{odd}(z)$ the z-transform of $f_{odd}(n)$. Then noting that $F_{even}(z)$ is an even function of z (only even powers of z) and $F_{odd}(z)$ an odd function of z (only odd powers of z):

$$F_{even}(z)=\{F(z)+F(-z)\}/2$$

$$F_{odd}(z)=\{F(z)-F(-z)\}/2$$

The F(−z) corresponds to the aliasing and appears with opposite signs; that is, a phase shift of π.

The color fringing can be reduced by a phase shift of π of the aliased components. However, this is very difficult to achieve, because the only available signal is the sum of the original signal with the aliasing signal. Therefore, the preferred embodiments have another approach.

As long as two (or more) subsampled signals (i.e., red, green, and blue) have identical characteristics (such as for a gray scale image), a perfect reconstruction of the original image can be achieved by just adding the subsampled signals. However, in CFA interpolation generally the subsampled signals stem from different color bands. Aliasing errors become visible especially at edges where the interpolated signals of the different color bands are misaligned. Therefore, the preferred embodiments counter color fringing at edges by reducing the aliasing components only at edges through utilization of other ones of the subsampled signals. This reduces artifacts, improves sharpness, and avoids additional postprocessing.

In particular, for Bayer pattern CFA the green channel has a higher cutoff frequency than that of the red and blue channels; thus the green channel has less significant aliasing. The aliasing signal to be compensated is a high-pass signal, which is now estimated as the high-pass component of the green channel; and this is added (rather than subtracted due to the phase shift due to the offset of the red and blue subsampling grids relative to the green subsampling grid) to the red and blue channels. The high-pass green component could be multiplied by a scale factor prior to addition to the red and blue subsamplings. The signals are added while interpolating red, blue or afterwards.

A Bayer pattern CFA imager provides only subarray nonzero samples for each color because each pixel only detects one color. This subarray sampling by the CFA of each input color full array (g(m,n), r(m,n), and b(m,n)) essentially aliases high frequency color content to low frequencies when interpolated to the full array. In particular, the CFA subsampling of the full input green g(m,n) to the m+n=even integer subarray has the effect of adding $(-)^{m+n}g(m,n)$ to g(m,n) to yield the subarray sampled output:

$$g_s(m,n)=[g(m,n)+(-)^{m+n}g(m,n)]/2.$$

Note $g_s(m,n)$ equals g(m,n) for m+n even and equals 0 for m+n odd. Hence, the z-transform of the CFA green output, $$G_s(z,w)=[G(z,w)+G(-z,-w)]/2$$

where G(z,w) denotes the z-transform of the full array input g(m,n). That is, a CFA only outputs $[g(m,n)+(-)^{m+n}g(m,n)]/2$ instead of the desired g(m,n).

Similarly for red and blue: red is nonzero only for m odd plus n even, so subarray sampling for red effectively adds aliases to r(m,n) to yield the subarray sampled:

$$r_s(m,n)=[r(m,n)+(-)^{m+1}r(m,n)+(-)^n r(m,n)+(-)^{m+n+1}r(m,n)]/4.$$

Indeed, for m odd plus n even all four terms add to yield r(m,n), whereas for m and n both even the second and fourth terms subtract, for m and n both odd the third and fourth terms subtract, and for m even plus n odd the second and third terms subtract. Thus the z-transform of CFA subarray sampled red output is $$R_s(z,w)=[R(z,w)-R(-z,w)+R(z,-w)-R(-z,-w)]/4$$

Likewise for blue: blue is nonzero only for m even plus n odd, so subarray subsampling for blue adds aliases to b(m,n) to equal $$b_s(m,n)=[b(m,n)+(-)^m b(m,n)+(-)^{n+1}b(m,n)+(-)^{m+n+1}b(m,n)]/4.$$

Again, for m even plus n odd all four terms add to yield b(m,n), whereas for m and n both odd the second and fourth terms subtract, for m and n both even the third and fourth terms subtract, and for m odd plus n even the second and third terms subtract. Thus the z-transform of CFA subarray sampled blue output is $$B_s(z,w)=[B(z,w)+B(-z,w)-B(z,-w)-B(-z,-w)]/4$$

Figure 11A:
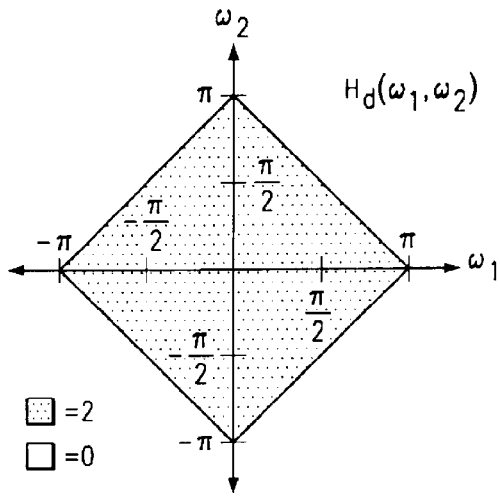
FIGS. 11a–11d illustrate spectra of ideal CFA interpolation filters.

For a Bayer pattern CFA the first preferred embodiments extract high frequency information from only the green output $g_s(m,n)$ due to the number of green subarray pixels being twice the number of red subarray pixels and also twice the number of blue subarray pixels. And based on the presumption that the high frequency content in red and in blue is similar to that in green, use the green high frequency information both to estimate (and thereby correct for) aliasing in red and blue and also to emulate red and blue high frequency content. In particular, proceed with the following steps:

(1) Interpolate the CFA green output $g_s(m,n)$ to the full array by low pass filtering $g_s(m,n)$ with a filter having a transfer function with spectrum approximating the diamond-shape as illustrated in FIG. 11a. The diamond shape boundary corresponds to the Nyquist frequencies of the green subarray, so the filter with z-transform equal to 2 within the diamond shape and 0 outside is the ideal filter. Explicitly, let the filter kernel be $h_d(m,n)$ and thus the filter output, g'(m,n), is given by:

$$g'(m,n)=\Sigma h_d(m-i,\ n-k)g_s(i,k)$$

In terms of z-transforms:

$$G'(z,w)=H_d(z,w)G_s(z,w)$$

where $H_d(z,w)$ is the z-transform of $h_d(m,n)$ and approximates the ideal diamond shape spectrum transfer function $$H(e^{j\omega}, e^{j\xi}) = \begin{cases} 2 & \text{if } |\omega + \xi| \leq \pi \\ 0 & \text{otherwise} \end{cases}$$

The value of 2 preserves normalization for the interpolation because the number of 0 subarray pixels in $g_s(m,n)$ being interpolated equals the number of (nonzero) green subarray pixels.

Note that the green subarray amounts to a $\pi/4$ rotation of a square subarray, so a change of variables to n'=(n+m) and m'=(n−m) makes the filter $h_d(m,n)$ separable into the product of two sin(x)/x type of functions of the variables n' and m' and could be used to simplify filter kernel approximations.

Figure 11B:
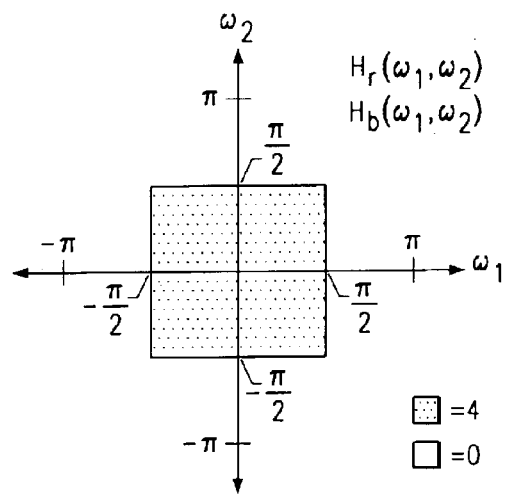

(2) Interpolate the CFA red and blue outputs $r_s(m,n)$ and $b_s(m,n)$ each to the full array by low pass filtering with a filter having a transfer function with spectrum approximating the ideal square-shape as illustrated in FIG. 11b. The square shape boundary corresponds to the Nyquist frequencies of the red and blue subarrays and thus the ideal filter. Explicitly, let the filters kernels be $h_r(m,n)$ and $h_b(m,n)$ and the filter outputs be r'(m,n) and b'(m,n), so:

$$r'(m,n) = \Sigma h_r(m-i,n-k)r_s(i,k)$$

$$b'(m,n) = \Sigma h_b(m-i,n-k)b_s(i,k)$$

In terms of z-transforms:

$$R'(z,w) = H_r(z,w)R_s(z,w)$$

$$B'(z,w) = H_b(z,w)B_s(z,w)$$

where $H_r(z,w)$ is the z-transform of $h_r(m,n)$, $H_b(z,w)$ is the z-transform of $h_b(m,n)$, and both approximate the ideal square spectrum transfer function $$H(e^{j\omega}, e^{j\xi}) = \begin{cases} 4 & \text{if } |\omega| \text{ and } |\xi| \leq \pi/2 \\ 0 & \text{otherwise} \end{cases}$$

The value 4 maintains normalization for the interpolation because the number of 0 subarray pixels being interpolated equals three times the number of red or blue subarray pixels.

(3) Extract the (high) frequencies present in the interpolated green which are missing from the interpolated red and blue; namely, the frequencies in the difference between the diamond-shape spectrum of FIG. 11a and the square shape spectrum of FIG. 11b. Then use these green high frequencies as substitutes for the missing red and blue high frequencies and add to the interpolated red and blue arrays. In particular, define horizontal and vertical high pass filters $h_h(m,n)$ and $h_v(m,n)$, respectively, plus corresponding filtered greens:

$$g_h(m,n) = \Sigma h_h(m-i,n-k)g_s(i,k)$$

$$g_v(m,n) = \Sigma h_v(m-i,n-k)g_s(i,k)$$

Figure 11C:
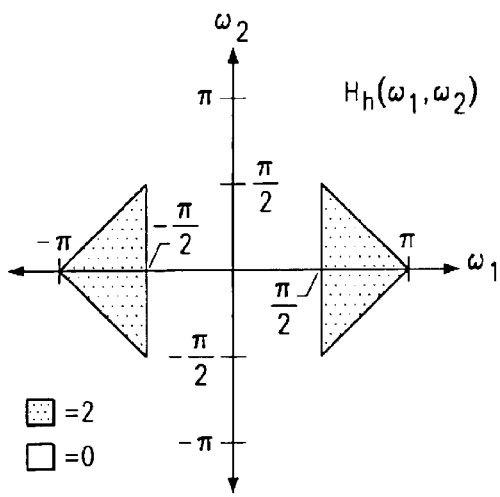
Figure 11D:
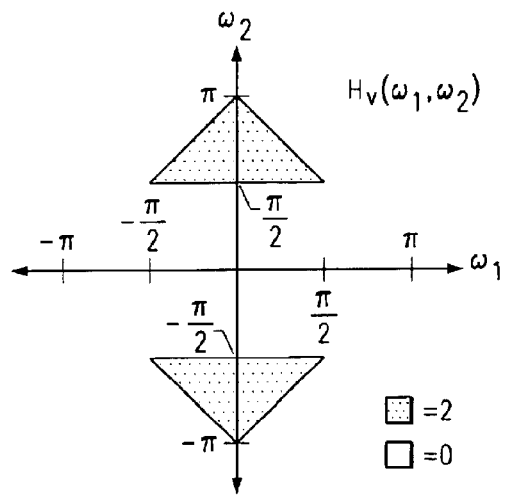

In terms of z-transforms:

$$G_h(z,w) = H_h(z,w)G_s(z,w)$$

$$G_v(z,w) = H_v(z,w)G_s(z,w)$$

where $H_h(z,w)$ is the z-transform of $h_h(m,n)$ and approximates the ideal transfer function illustrated in FIG. 11c $$H(e^{j\omega}, e^{j\xi}) = \begin{cases} 2 & \text{if } |\omega + \xi| \leq \pi \text{ and } |\omega| > \pi/2 \\ 0 & \text{otherwise} \end{cases}$$

and $H_v(z,w)$ is the z-transform of $h_v(m,n)$ and approximates the ideal transfer function illustrated in FIG. 11d $$H(e^{j\omega}, e^{j\xi}) = \begin{cases} 2 & \text{if } |\omega + \xi| \leq \pi \text{ and } |\xi| > \pi/2 \\ 0 & \text{otherwise} \end{cases}$$

(4) Add the green high frequencies from (3) to the interpolated red and blue to yield final red and blue. In particular, for red in terms of z-transforms:

$$R''(z,w) = R'(z,w) + G_h(z,w) + G_h(-z,w) + G_v(z,w) - G_v(z,-w)$$

and for blue:

$$B''(z,w) = B'(z,w) + G_h(z,w) - G_h(-z,w) + G_v(z,w) + G_v(z,-w)$$

The actual filters used can vary as long as their spectra approximate those of FIGS. 11a–11d. In particular, the two-dimensional size of a filter could be 15 by 15 pixels and approximate the ideal pursuant to some criteria. Indeed, filter design provides multiple approaches. Larger or smaller filter kernels allow tradeoffs of better quality and simpler computations.

Alternative Expression

An alternative expression for the reduced aliasing CFA interpolation would be to define a square shape spectrum filter $h_s(j,k)$ with spectrum approximating that of FIG. 11b and a filter $h_{d-s}(j,k)$ with spectrum approximating the difference of the diamond shape of FIG. 11a and the square shape of FIG. 11b, that is, a high frequency filter. Then the CFA interpolation in terms of these two filters, each filter with spectrum magnitude approximating 1, would be $$g''(m,n) = \Sigma 2h_s(m-i,n-k)g_s(i,k) + \Sigma 2h_{d-s}(m-i,n-k)g_s(i,k)$$

$$r''(m,n) = \Sigma 4h_s(m-i,n-k)r_s(i,k) + \Sigma 2h_{d-s}(m-i,n-k)g_s(i,k)$$

$$b''(m,n) = \Sigma 4h_s(m-i,n-k)b_s(i,k) + \Sigma 2h_{d-s}(m-i,n-k)g_s(i,k)$$

The multipliers 2 and 4 again maintain normalization for the interpolations. Of course, the green high frequency added to the red and blue could be scaled according to relative red-to-green and blue-to-green estimates.

MODIFICATIONS

The preferred embodiments may be varied while retaining the feature of adding/subtracting the high frequency green which is in the band missing in the red and blue to the red and blue as an approximation of the high frequency of the red and blue in this band.

For example, the added/subtracted high frequency could be scaled (multiplied by a constant or frequency-dependent weighting); colors other than red, green, and blue may be used; the fraction of pixels devoted to each color may be varied, especially if the number of colors is less than or greater than three;

What is claimed is:

1. A method of interpolation of a color-array, comprising:
   (a) interpolating each of a plurality of colors from a color-filtered array;
   (b) approxmating the portion of a first of said interpolated colors from step (a) which is in a frequency band missing from a second of said interpolated colors from step (a); and (c) combining the result of step (b) with said second of said interpolated colors.

2. The method of claim 1, wherein:
   (a) said color-filter array has a Bayer pattern; and
   (b) said first of said interpolated colors is green.

3. A method of interpolation for a Bayer pattern color-filtered array, comprising the steps of:
   (a) providing a Bayer pattern color-filtered array;
   (b) interpolating the green subarray of the color-filtered array with a filter having a transfer function approxmating $$H(e^{j\omega}, e^{j\xi}) = \begin{cases} 2 & \text{if } |\omega + \xi| \leq \pi \\ 0 & \text{otherwise} \end{cases}$$

to yield a green array;

(c) interpolating the red and blue subarrays of the color-filtered array with a filter having a transfer function approxmating:

$$H(e^{j\omega}, e^{j\xi}) = \begin{cases} 4 & \text{if } |\omega| \text{ and } |\xi| \leq \pi/2 \\ 0 & \text{otherwise} \end{cases}$$

to yield a red array and a blue array;

(d) adding the high frequency portion of the green array to the red array and to the blue array to form an adjusted red array and an adjusted blue arrays, whereby the green array, the adjusted red array, and the adjusted blue array together form an interpolated Bayer pattern color-filtered array.

4. A camera, comprising:
   (a) a color-filtered array sensor; and
   (b) a color-filtered array interpolator coupled to said sensor, said interpolator including (i) a first interpolation filter for a first color, (ii) a second interpolation filter for a second color, and (iii) a third filter approximating the frequency region difference between said first interpolation filter and said second interpolation, said third filter for input said first color and for output coupled to the output of said second interpolation filter.

* * * * *